Feb. 26, 1924.                                               1,485,314
J. H. TAYLOR ET AL
ICE LOOSENING DEVICE
Filed June 11, 1923          2 Sheets-Sheet 1

Joseph H. Taylor
William F. Powell   INVENTOR

BY Victor J. Evans
ATTORNEY

WITNESS:

Feb. 26, 1924.
J. H. TAYLOR ET AL
1,485,314
ICE LOOSENING DEVICE
Filed June 11, 1923 2 Sheets-Sheet 2
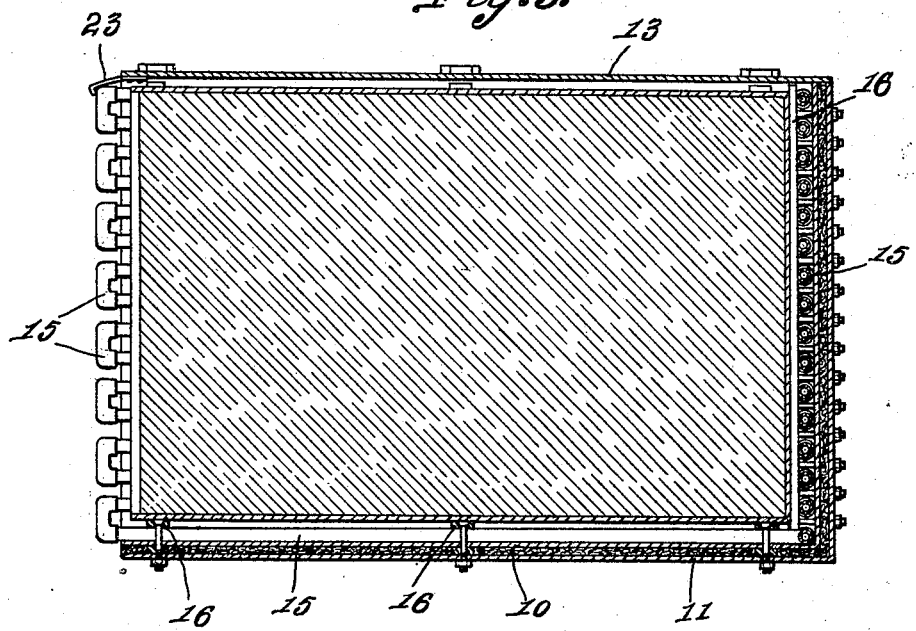
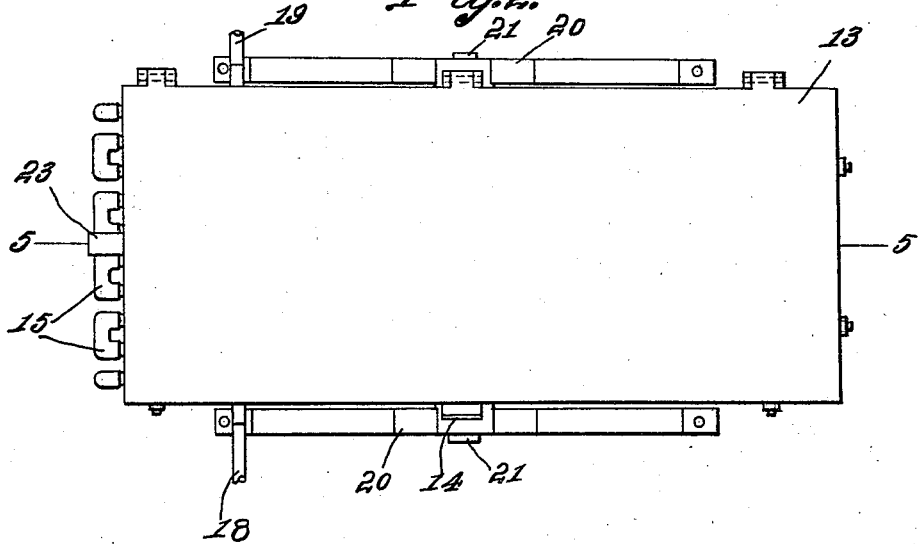
Joseph H. Taylor
William F. Powell
INVENTOR
BY Victor J. Evans
ATTORNEY
WITNESS:

Patented Feb. 26, 1924.

1,485,314

UNITED STATES PATENT OFFICE.

JOSEPH H. TAYLOR AND WILLIAM F. POWELL, OF ROCKY MOUNT, NORTH CAROLINA.

ICE-LOOSENING DEVICE.

Application filed June 11, 1923. Serial No. 644,753.

*To all whom it may concern:*

Be it known that we, JOSEPH H. TAYLOR and WILLIAM F. POWELL, citizens of the United States, residing at Rocky Mount, in the county of Edgecombe and State of North Carolina, have invented new and useful Improvements in Ice-Loosening Devices, of which the following is a specification.

This invention contemplates the provision of an apparatus for thawing ice from molds or cans in artificial ice systems, the apparatus including a receptacle lined with a plurality of pipe sections having a configuration corresponding to the shape of the receptacle, and through which is allowed to flow a fluid for producing artificial heat for the purpose specified.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 2 is a top plan view.

Figure 5 is a sectional view taken on the line 5—5 of Figure 2.

Figure 1:
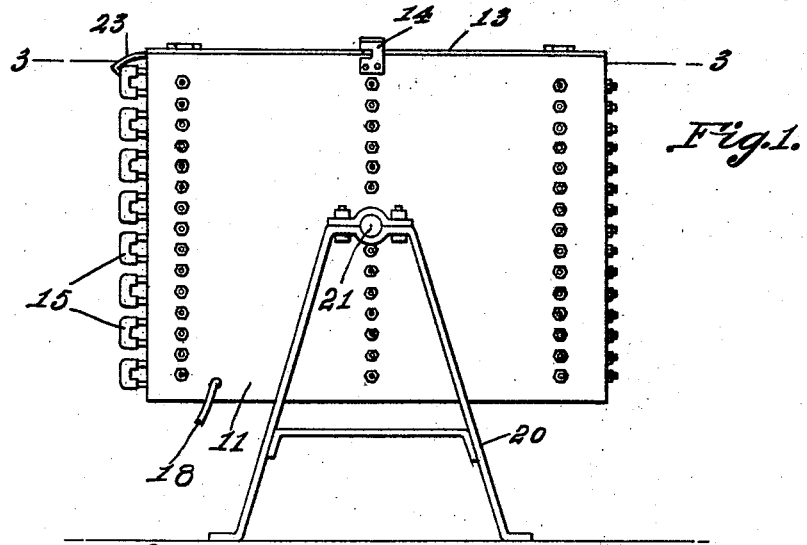
Figure 1 is a side elevation of the apparatus showing it in one of its positions.
Figure 3:
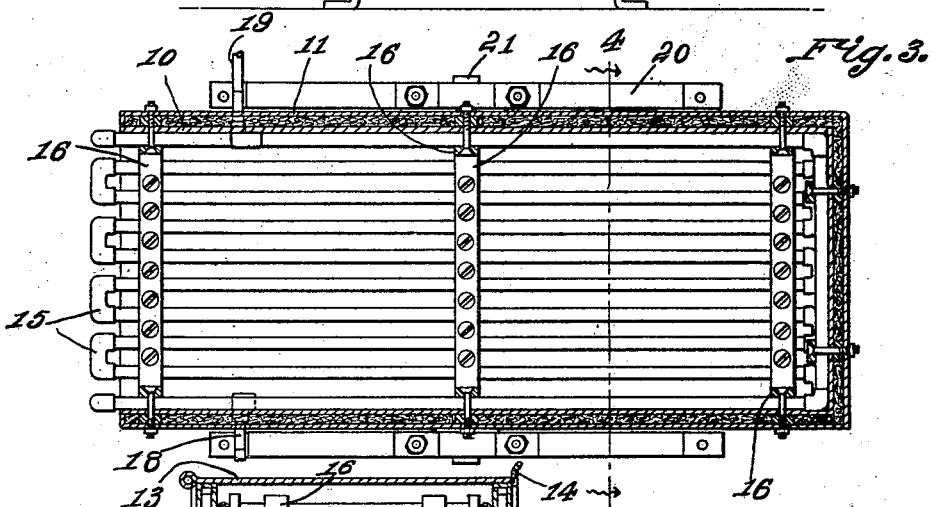
Figure 3 is a sectional view taken on the line 3—3 of Figure 1.
Figure 4:
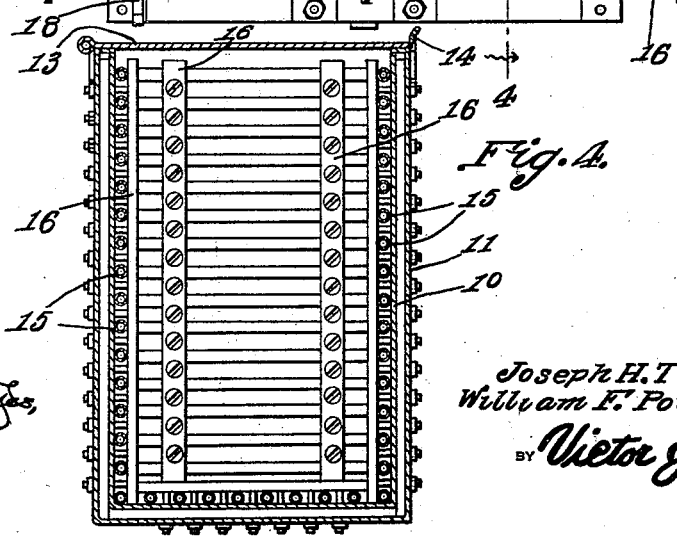
Figure 4 is a sectional view taken on the line 4—4 of Figure 3.

The apparatus forming the subject matter of the present invention comprises a receptacle open at one end, the receptacle being formed with spaced inner and outer sections of identical configuration, which sections are indicated at 10 and 11 respectively. Asbestos or the like is arranged in the space between these sections. One side of the receptacle is provided with an opening through which the molds or cans containing the ice to be thawed is introduced, the receptacle and this opening is normally closed by a hinged door 13. A suitable latch 14 is used to hold the door in its closed position. The interior of the receptacle is lined with piping designed to provide a plurality of sections 15, the sections being of the configuration illustrated so as to extend across the bottom of the receptacle and also arranged along the sides and end walls thereof, covering the entire area of the interior of the receptacle. Supported by the walls of the receptacle are vertically disposed straps 16 which are arranged inwardly of the pipe sections, these straps being arranged upon each wall of the receptacle also arranged to extend across the bottom thereof, to assist in holding the pipe sections within the receptacle, and at the same time prevent the molds or cans from contacting the pipe sections, thereby allowing the heat to circulate more thoroughly about the mold or can so that the result desired can be quickly accomplished. It is of course to be understood that hot water, steam or other fluid circulates through the pipe sections, thus producing artificial heat within the receptacle for the purpose of thawing the ice from the molds or cans and that the pipe sections having a single inlet 18 and a single outlet 19. The apparatus is mounted upon a suitable stand 20 which provides bearings for the projections 21 carried by the opposite side walls of the receptacle, and thus allows the receptacle to be tilted upon the support and occupy either of two positions. For instance the normal position of the receptacle is at a right angle to that shown in Figure 1, in which position the opened end of the receptacle is arranged uppermost, with the door arranged in a vertical plane. The ice in the mold or can is introduced into the receptacle through the door opening when the receptacle is in the position just mentioned and the receptacle is subsequently swung upon its pivots to the position shown in Figure 1. After the ice has been thawed or loosened from the mold or can, the receptacle is further tilted downwardly to allow the ice to slide out of the can, but means is provided to hold the can within the receptacle. This means is preferably in the nature of a catch hook 23 which projects beyond the open end of the receptacle, and positioned to engage the adjacent end of the can when the receptacle is tilted for the purpose of removing the ice therefrom.

While it is believed that from the foregoing description, the nature and advantages of the invention will be readily apparent, we desire to have it understood that we do not limit ourselves to what is herein shown and described and that such changes may be resorted to when desired as fall within the scope of what is claimed.

Having thus described the invention, we claim:

1. An apparatus for thawing ice from molds, comprising a receptacle, piping lining the interior of the receptacle and through which a fluid is adapted to circulate to produce an artificial heat, said piping having an inlet and an outlet opening, and straps supported by the bottom and end walls of the receptacle to prevent the mold from coming in contact with said piping.

2. An apparatus for thawing ice from molds comprising a receptacle having inner and outer sections, asbestos material arranged in the space between the sections, pipe sections lining the interior of the receptacle and arranged across the bottom and along the walls thereof, and through which a fluid is adapted to circulate to produce an artificial heat, and straps arranged inwardly of the pipe sections and supported by the bottom and end walls of the receptacle to prevent the mold from coming in contact with said pipe sections.

3. An apparatus for thawing ice from molds comprising a double walled receptacle, asbestos material arranged between the walls of the receptacle, pipe sections lining the interior of the receptacle and through which the fluid is adapted to circulate to produce an artificial heat, said pipe sections having a single inlet and a single outlet, means for supporting the receptacle for pivotal movement, whereby the receptacle can be arranged vertically or horizontally, a door on one side of the receptacle, and said receptacle being open at one end for the purpose specified.

In testimony whereof we affix our signatures.

JOSEPH H. TAYLOR.
WILLIAM F. POWELL.